United States Patent
Alpert et al.

(10) Patent No.: US 9,536,144 B2
(45) Date of Patent: Jan. 3, 2017

(54) AUTOMATIC IMAGE CLASSIFICATION

(71) Applicant: International Business Machines Corporation, Armonk, NY (US)

(72) Inventors: Sharon Alpert, Rehovot (IL); Mattias Marder, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 77 days.

(21) Appl. No.: 14/582,216

(22) Filed: Dec. 24, 2014

(65) Prior Publication Data
US 2016/0188952 A1 Jun. 30, 2016

(51) Int. Cl.
G06K 9/36 (2006.01)
G06K 9/00 (2006.01)
G06K 9/62 (2006.01)

(52) U.S. Cl.
CPC .............. G06K 9/0055 (2013.01); G06K 9/628 (2013.01); G06K 9/6276 (2013.01)

(58) Field of Classification Search
CPC .. G06K 9/00; G06K 9/00288; G06K 9/00463; G06K 9/00483; G06K 9/0055; G06K 9/62; G06K 9/624; G06K 9/6262; G06K 9/627; G06K 9/6276; G06K 9/628; G06K 9/723; G06K 2209/01; G06F 8/30; G06F 15/18; G06F 17/2735; G06F 17/3002; G06F 17/30029; G06F 17/30247; G06F 17/30256; G06F 17/30265; G06F 17/30528; G06F 17/30554; G06F 17/30592; G06F 17/30598; G06F 17/30731; G06F 17/30867; G06F 17/30873; G06F 17/30876; G06F 21/78; G06F 21/80; G06N 3/08; G06N 7/005; G06Q 10/087; G06Q 30/02; G06Q 30/06; G06Q 30/0601; G06Q 30/0625; G06Q 30/0639; G06Q 30/0641; G06Q 99/00; B07C 5/342

See application file for complete search history.

(56) References Cited

U.S. PATENT DOCUMENTS 8,438,084 B1 5/2013 Tesler et al.
8,600,989 B2 * 12/2013 Hull ................. G06F 17/30247
707/736

(Continued)

FOREIGN PATENT DOCUMENTS

WO 2013169155 11/2013

OTHER PUBLICATIONS

Wang, C.-C., "Display Online Store Products by Automatic Merchandise Classification Based on Product Similarity", Management of Innovation and Technology, 2008. ICMIT 2008. 4th IEEE International Conference, Sep. 21-24, 2008, pp. 710-715.

(Continued)

Primary Examiner — Jose Couso
(74) Attorney, Agent, or Firm — Ziu Glazberg

(57) ABSTRACT

A method, system and product for image classification. The method comprising obtaining a set of encoding functions and signature values which corresponds to a set of class images, wherein each pair of an encoding function and a signature value corresponds to a class image of the set of class images, wherein the signature value is a value produced by applying the encoding function on the class image; obtaining an image to be classified to a class associated with a class image of the set of class images; with respect to each class image of the set of class images: determining a transformation from the image to the class image; and applying the encoding function using the transformation on (Continued)

Figure 1A:
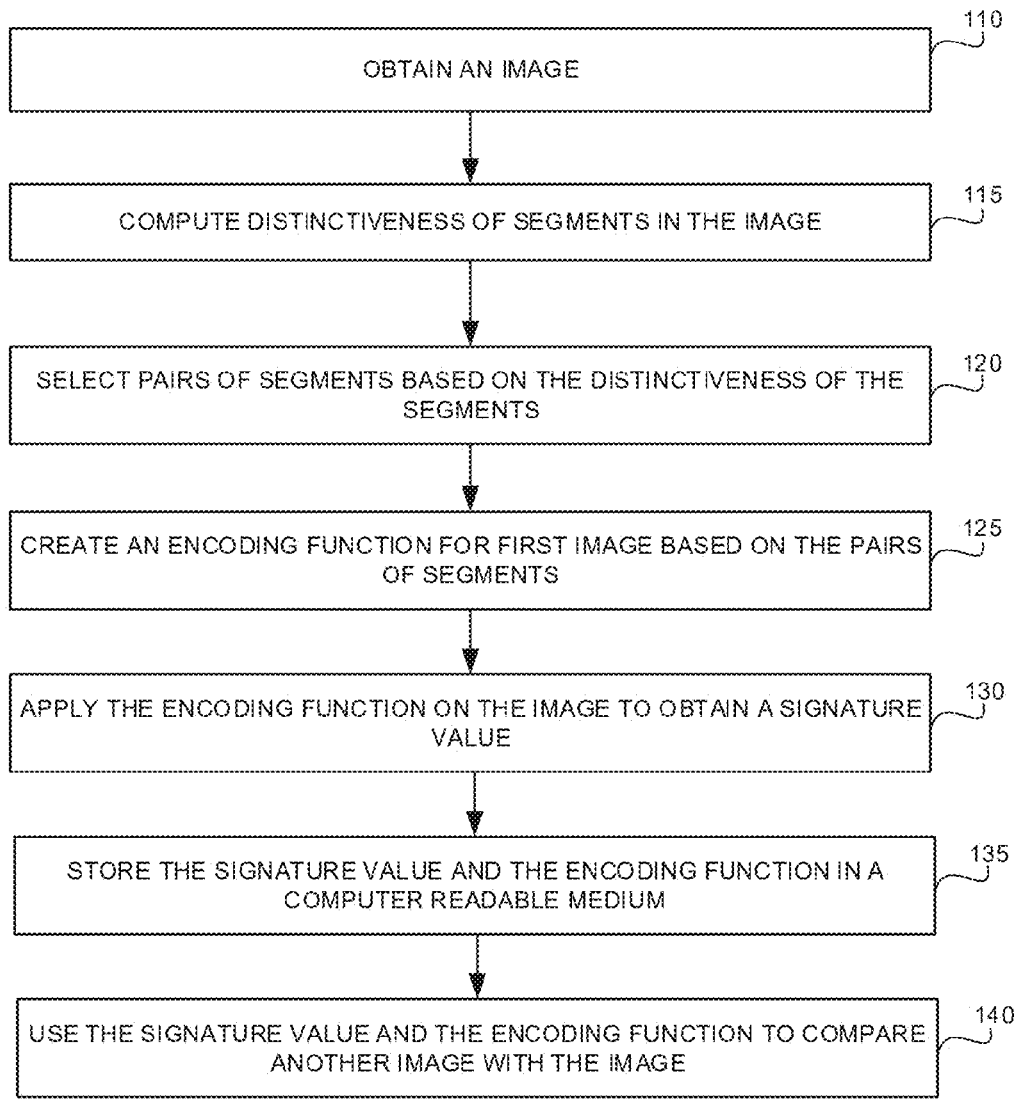

the image to produce a value; and automatically determining a class to which the image is classified based on the values and the signature values.

17 Claims, 4 Drawing Sheets

(56) References Cited

U.S. PATENT DOCUMENTS

| | | |
|---|---|---|
| 8,639,041 B2 | 1/2014 | Grigsby et al. |
| 8,923,608 B2 * | 12/2014 | Devin .................. G06K 9/6262 382/159 |
| 2009/0012971 A1 | 1/2009 | Hunt et al. |
| 2011/0004571 A1 | 1/2011 | Parikh et al. |
| 2012/0259882 A1 | 10/2012 | Thakur et al. |
| 2012/0265736 A1 | 10/2012 | Williams et al. |

OTHER PUBLICATIONS

"Product Differentiation", can be found at: http://www.economicswebinstitute.org/glossary/product.htm.

* cited by examiner

AUTOMATIC IMAGE CLASSIFICATION

TECHNICAL FIELD

The present disclosure relates to image processing in general, and to classification of images, in particular.

BACKGROUND

In computer vision applications intended for image recognition, it is often required to differentiate between visually similar image classes. For instance, many images from the same group of interest may have the same graphics and almost identical caption apart from small changes within the image. One solution to such a problem is first to identify visually similar locations in all similar classes. Then, relative to those locations, to attempt to find dissimilar discriminative locations.

Image classification includes a broad range of decision-theoretic approaches to the identification of images or parts thereof. Classification algorithms are generally based on the assumption that the image depicts one or more features, such as geometric parts in the case of a manufacturing classification system, or spectral regions in the case of remote sensing, or the like, and that each of these features belongs to one of several distinct and exclusive classes. The classes may be specified a priori by an analyst, as in supervised classification or automatically clustered into sets of prototype classes, as in unsupervised classification, where the analyst merely specifies the number of desired categories.

Image classification analyzes numerical properties of various image features and organizes data into categories. Supervised classification algorithms typically employ two phases of processing: training and predicting. In the initial training phase, characteristic properties of typical image features are isolated from a plurality of images that correspond to the class and, based on these, a unique description of each classification category, i.e. training class, is created. In the subsequent predicting phase, these feature-space partitions are used to classify image features. Unsupervised classification algorithms typically do not utilize a training set but rather are configured to automatically discover structure in data provided thereto in order to generalize mapping from inputs to outputs. In order that such generalization be accurate, a plurality of representative images from each class need to be processed.

BRIEF SUMMARY

One exemplary embodiment of the disclosed subject matter is a method comprising: obtaining a set of encoding functions and signature values which corresponds to a set of class images, wherein each pair of an encoding function and a signature value corresponds to a class image of the set of class images, wherein the signature value is a value produced by applying the encoding function on the class image; obtaining an image to be classified to a class, wherein the class is associated with a class image of the set of class images; with respect to each class image of the set of class images: determining a transformation from the image to the class image; and applying the encoding function using the transformation on the image to produce a value; and automatically determining, by a processor, a class to which the image is classified based on the values and the signature values.

Another exemplary embodiment of the disclosed subject matter is a method comprising: obtaining an image that is representative of a class of images; computing, based on internal statistics of the image, distinctiveness of segments in the image, wherein the computing is performed by a processor; selecting pairs of segments based on the distinctiveness of the segments; creating an encoding function for the image based on the pairs of segments, wherein the encoding function is configured to provide a value for a second image based on properties of the second image at segments which correspond to the pairs of segments; applying the encoding function on the image to obtain a signature value; and storing, in a non-transitory computer readable medium, the signature value and the encoding function; whereby enabling comparing another image with the image by applying the encoding function on the other image and comparing a resulting value with the signature value.

Yet another exemplary embodiment of the disclosed subject matter is a computerized apparatus having a processor, the processor being adapted to perform the steps of: obtaining a set of encoding functions and signature values which corresponds to a set of class images, wherein each pair of an encoding function and a signature value corresponds to a class image of the set of class images, wherein the signature value is a value produced by applying the encoding function on the class image; obtaining an image to be classified to a class, wherein the class is associated with a class image of the set of class images; with respect to each class image of the set of class images: determining a transformation from the image to the class image; and applying the encoding function using the transformation on the image to produce a value; and automatically determining, a class to which the image is classified based on the values and the signature values.

THE BRIEF DESCRIPTION OF THE SEVERAL VIEWS OF THE DRAWINGS

Figure 1B:
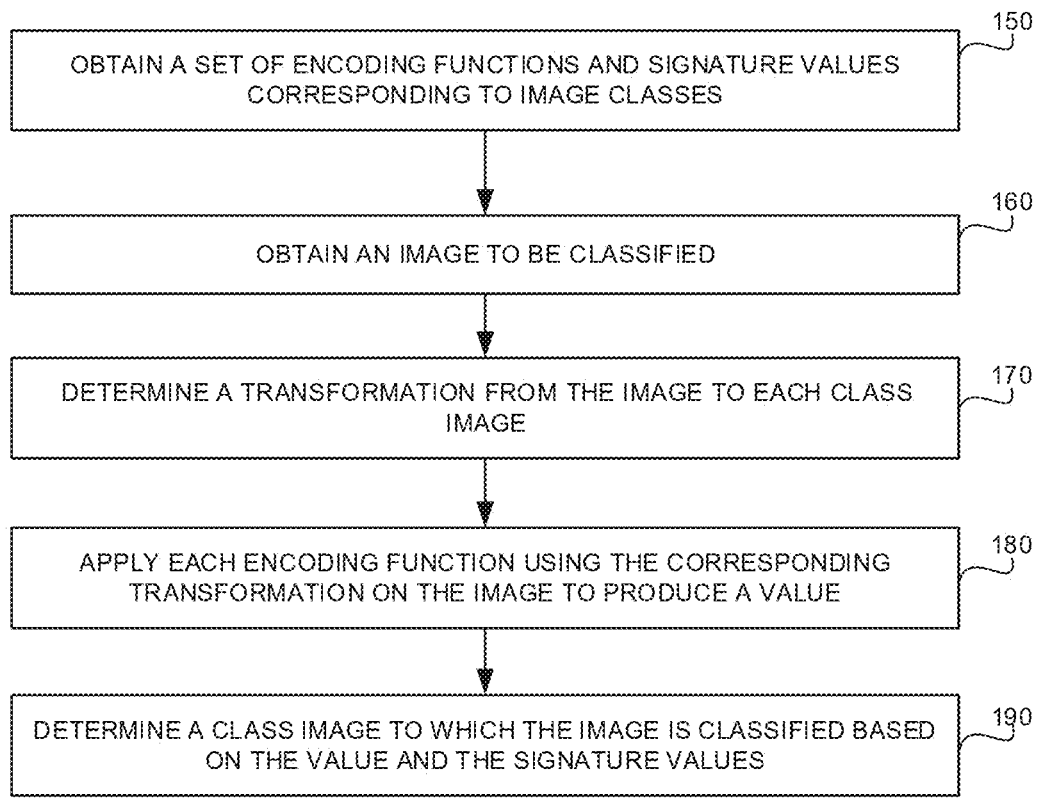
Figure 2:
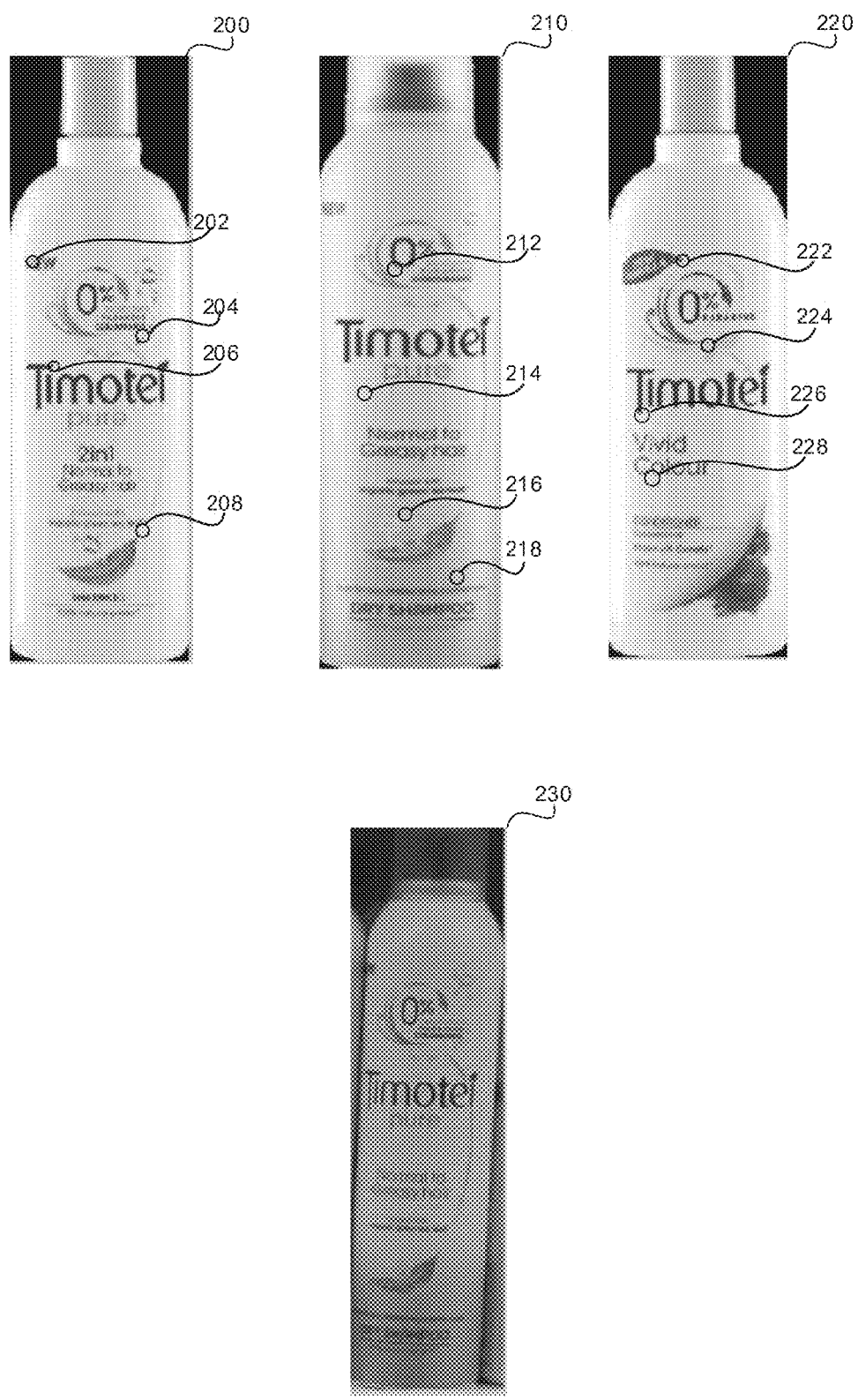
Figure 3:
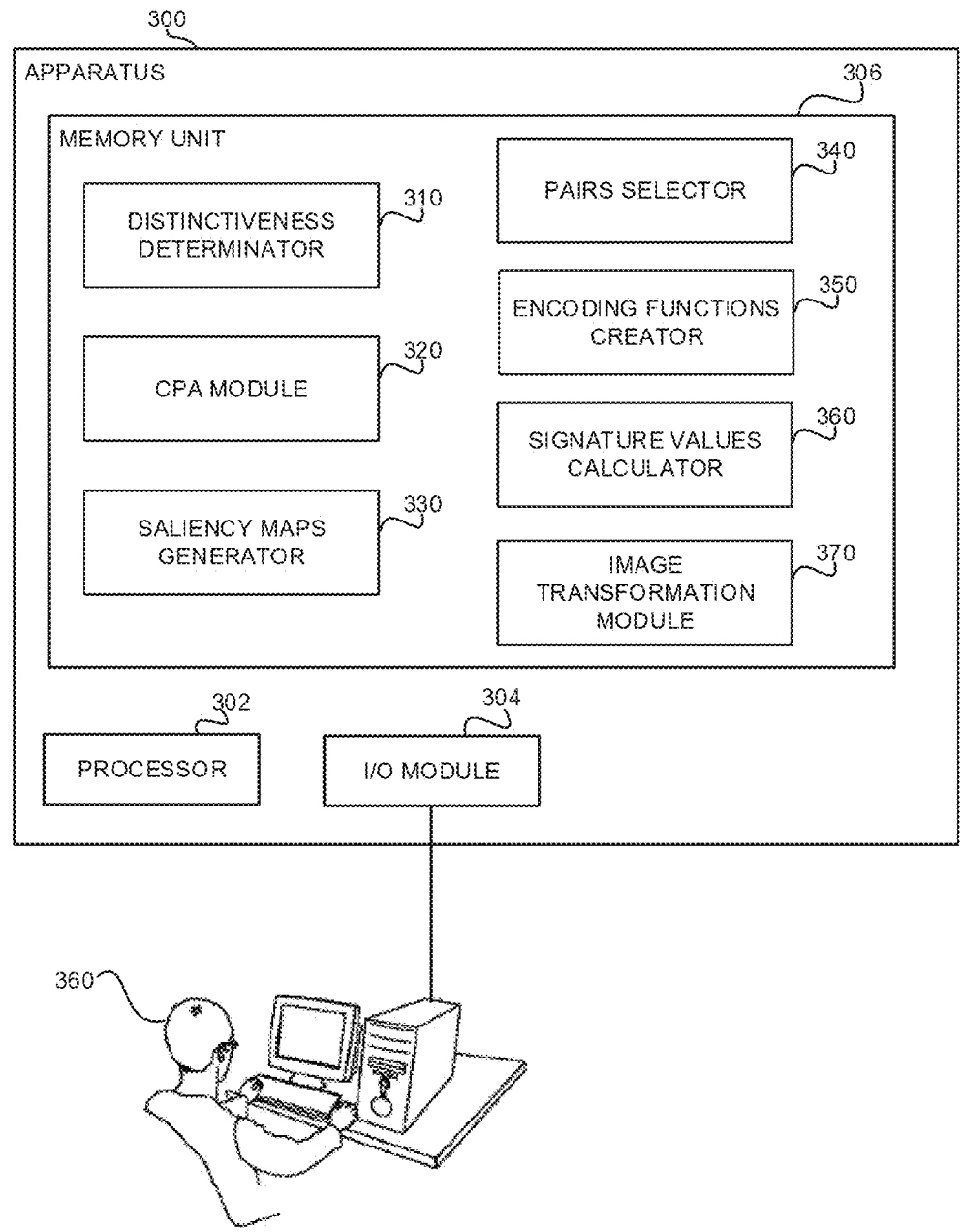

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings:

FIGS. 1A and 1B flowchart diagrams of methods, in accordance with some exemplary embodiments of the disclosed subject matter;

FIG. 2 shows an illustration of class images and an image to be classified, in accordance with some exemplary embodiments of the disclosed subject matter; and FIG. 3 shows a computerized environment in which the disclosed subject matter is used, in accordance with some exemplary embodiments of the subject matter.

DETAILED DESCRIPTION

One technical problem dealt with by the disclosed subject matter is to classify an image to a class. In some cases, the classification may be performed without relying on an extensive image dataset providing alternative examples of the same class.

It may be desired to provide a single image representative of a class to be used in order to determine whether another image is classified as the same class or not. In some cases, the single representative image, also referred to as a training image, may be a detailed graphical illustration of an object. The image to be classified may be a photograph of the object, which may be captured using a camera. A human may be able to manually distinguish and determine similarity between two images that is consistent with classifying both images together as opposed to other similarities which are not relevant for classification. For example, two images of bottles of shampoo may be similar on one hand but would still be classified differently by a person in view of a different brand name or product type. It may be desired to provide such capability to an automated machine.

One technical solution is to determine a class to which the image is classified based on signature values of images representing the different potential image classes. In some exemplary embodiments, a set of encoding functions and signature values which correspond to a set of class images may be obtained. Each pair of an encoding function and a signature value may correspond to a different class. The encoding function may be determined based on the class image of the class. The signature value may be a value produced by applying the encoding function on the class image.

In some exemplary embodiments, an encoding function may be created for an image based on distinctiveness of segments within the image. A segment may be a region within the image. In some exemplary embodiments, a segment may be a small group of nearby pixels, such as a single pixel (e.g. 1×1 region), 2×2 pixels, 5×5 pixels, 10×3 pixels, or the like. Additionally or alternatively, a segment may be a set of one or more adjacent pixels arranged in substantially a rectangular shape (e.g., adding or subtracting about 2%, 5%, 10% or a similar portion of the pixels would result in a rectangular shape). Additionally or alternatively, the segment may be pixels arranged in a polygon shape that conforms to image gradients.

In some exemplary embodiments, the distinctiveness of segments within the image may be computed based on internal statistics of the image. The distinctiveness of a segment may be defined as a distance to the most similar other segments in the image or portion thereof (e.g. a search window within the image). A distinctive segment may comprise a group of pixels whose local neighborhood is distinctive in color, in pattern, or other features. Additionally or alternatively, a distinctive segment may be distinctive from all other segments in the image. Distinctiveness may be determined by considering internal statistics of segments in the image. In some exemplary embodiments, a segment may be considered distinctive if the properties of its surrounding segment cannot be explained well by other image segments.

In some exemplary embodiments, distinctive segments may be identified by measuring a distance to an average segment. An image segment may be considered distinct if it is dissimilar to the average segment of the image. In some cases, the more the image segment is dissimilar to the average segment, the more it is considered distinct. Additionally or alternatively, distinctive segments may be segments that are not repeated many times in a given scene within an image.

In some exemplary embodiments, a principal component analysis may be applied to detect distinctive segments of the image. Principal component analysis may be a statistical procedure that uses an orthogonal transformation to convert a set of observations of possibly correlated variables into a set of values of linearly uncorrelated variables called principal components. The number of principal components may be less than or equal to the number of original variables. The transformation may be defined in such a way that the first principal component has the largest possible variance (that is, accounts for as much of the variability in the data as possible), and each succeeding component in turn has the highest variance possible under the constraint that it is orthogonal to (i.e., uncorrelated with) the preceding components. Principal component analysis may be sensitive to the relative scaling of the original variables. The principal component analysis may be used to represent a set of segments of an image. The representation may be used to determine distinctness of the segments. The principal component analysis may define a new orthogonal coordinate system that optimally may describe variance in the image set of segments. In some exemplary embodiments, coefficients of each segment in the representation according to the principal component analysis may be summed to determine distinctiveness of the segment.

In some exemplary embodiments, pairs of segments of the image may be selected based on the distinctiveness of segments within the image. Each selected distinctive segment may be a local maximum segment in a saliency map. Additionally or alternatively, each distinctive segment may be selected randomly from a neighborhood of local maximum segment in the saliency map. The saliency map may be a map that represents visual saliency of a corresponding image portions. In some exemplary embodiments, the saliency map may be topographically arranged. Distinctive segments may be the most salient locations in the saliency map. The most salient locations may be obtained by computing position of local maximum points in the saliency map.

In some exemplary embodiments, in order to define an encoding function of K bits, a K set of pairs of segments may be selected. In some exemplary embodiments, the K pairs may be randomly selected from the group of most salient segments. In some exemplary embodiments, the K pairs of segments may be selected from a larger set of pairs. As an example a set of J pairs may be determined and a subset of the K pairs of segments with the largest computed differences therebetween may be selected out of the J pairs.

In some exemplary embodiments, the encoding function may be configured to provide a value for the image based on properties of the image. In some exemplary embodiments, the encoding function may be created based on the pairs of segments. Additionally or alternatively, the encoding function may be configured to provide a value for the image based on properties of the image at segments which correspond to the pairs of segments.

In some exemplary embodiments, the encoding function may be a function which encodes a bit in a result value based on a relation between a first segment of a pair of segments and a second segment of the pair of segments. In some exemplary embodiments, encoding function may encode ordinal statistic values (e.g., value of a predetermined relation) between the segments. The encoding function may define a signature of the image based on ordinal statistics between segments in the image that correspond to the distinctive segments of the class image.

In some exemplary embodiments, a signature value may be produced by applying the encoding function on the class image. The signature value may be used as a unique signature identifying the class of the class image. The signature may be compared with other values produced by applying the same encoding function on other images in order to determine a likelihood that the other images are from the same class as the class image.

It will be noted that for each class image, the encoding image is potentially different and is determined based on the characteristics of that particular class image. As a result, using a different class image to represent the same class may produce a different encoding function. Additionally or alternatively, each such encoding function may be defined based solely on a single image and not require a set of alternative similar images.

In some exemplary embodiments, applying the encoding function on the image may be performed in a linear time with respect to a number of bits in the signature value (e.g., K). In some exemplary embodiments, the number of bits may be 5, 10, 20, or the like.

In some exemplary embodiments, the signature value and the encoding function may be stored in a computer readable medium. The signature value and the encoding function may be used to compare another image with the image by applying the encoding function on the other image and comparing a resulting value with the signature value. In some exemplary embodiments, such comparison may be performed in linear time with respect to the number of bits in the signature value and may not depend upon a total number of classes to be compared. As a result, assuming a constant number of bits in the signature (e.g., 40 bits), comparing the image to all potential M classes may be performed in computational complexity of O(M).

In some exemplary embodiments, an image to be classified to one of the classes may be obtained. In order to classify the image to a class, a transformation from the image to each class image may be determined. In some exemplary embodiments, the transformation may be a function mapping a set of segments of the image to another set of segments that matches the segments of the class image. The transformation may be applied to overcome differences or distortions in the image, different coloring scheme, different lighting conditions, different angle observing an object depicted in the image, different contrast parameters, or the like. The encoding function of each class image may be applied on the image using the corresponding transformation to produce a value. A class to which the image may be classified may be determined, based on comparing the values to the signature value of each class image.

In some exemplary embodiments, the signature value and the produced values may be binary values. Determining a class to which the image may be classified may be performed by computing a hamming distance between each produced value and the signature value of the associated class image, and classifying the image to the class associated with class image for which a minimal hamming distance is computed.

In some exemplary embodiments, determining a class to which the image may be classified may be performed in a linear time with respect to a multiplication of the number of bits in the signature value (e.g., K) and a total number of class images (e.g., M) (e.g., O(K×M)).

One technical effect of the disclosed subject matter is to automatically classify images to classes in real-time. The disclosed subject matter may enable comparing one image with a relatively large number of potential classes in relatively efficient manner which does not depend on a number of specimens of each class. In some exemplary embodiments, the computational complexity of the comparison may be O(M×K).

Another technical effect may be classifying an image to an image class without the use of a set of images. The disclosed subject matter may classify the image based only on internal statistics of the image class. An ordinal statistics of segments in the image may be utilized. It may be assumed that the ordinal relation between corresponding segments in images of the same class may be substantially the same even when there are absolute differences (such as caused by different lighting conditions of each image or other similar parameters or characteristics). In some exemplary embodiments, by relying on relational statistics between the segments, absolute differences may be overlooked and not cause the process to provide wrong results. Referring now to FIG. 1A showing a flowchart diagram of a method, in accordance with some exemplary embodiments of the disclosed subject matter.

In Step 110, an image may be obtained. The image may be an image specimen of a class of images, and may be referred to as a class image. The image may be an image representative of the class, such as providing a representative depiction of images in the class. In some exemplary embodiments, the class may be an object that is captured in an image, such as a same retail product that is captured on different occasions, at different locations and using different mechanisms and imaging conditions. In some exemplary embodiments, the image may be a digitally represented image. In some exemplary embodiments, the image may have a finite set of digital values, referred to as pixels, which define the image. Additionally or alternatively, the image may contain a fixed number of rows and columns of pixels. In some exemplary embodiments, the pixels may be the smallest individual element in an image. The pixels may hold quantized values of measurements at any specific point, such as but not limited to values that represent the brightness of a given color. The pixels may be stored in a computer memory as a raster image, a raster map, a two-dimensional array of small integers, or the like. Additionally or alternatively, the image may be a 3D image, a set of image stream over time, or the like.

Various images may be created by a variety of input devices and techniques, such as digital cameras, scanners, coordinate-measuring machines, seismographic profiling, airborne radar, or the like. Additionally or alternatively, images may be synthesized from arbitrary non-image data, such as mathematical functions or three-dimensional geometric models. In some exemplary embodiments, the image may be a medical image, such as an ultrasonic image, a Magnetic Resonance Image (MRI), a tomographic image, or the like.

In Step 115, distinctiveness of segments in the image may be computed. In some exemplary embodiments, a segment may be a set of one or more adjacent pixels in the image. Additionally or alternatively, the one or more adjacent pixels may be arranged in substantially a rectangular shape. In some exemplary embodiments, two different pixels may belong to the same segment if they have the same color. In some exemplary embodiments, the set of one or more adjacent pixels may comprise a single pixel, 2×2 pixels, 4×4 pixels, 5×10 pixels, or the like.

In some exemplary embodiments, distinctiveness of segments may be determined based on each segments' dissimilarity to other segments. Two segments in an image may be similar if their perceptual distance is small. Accordingly, a distinctiveness of an image segment may be defined as a perceptual distance between the image segment and the most similar other segments in the image or portion thereof. The distinctiveness of an image segment may or may not be an absolute measure. The distinctiveness of an image segment may be subordinate to a chosen matching strategy. A matching strategy may define properties to compare between segments, such as but not limited to an average color of the segment, an aggregated brightness values, a median value of a visual property, or the like. Different aspects of distinctiveness may be considered, such as but not limited to color distinctiveness, pattern distinctiveness, or the like. In some exemplary embodiments, a distinctive segment may consist of pixels whose local neighborhood is distinctive in one or more properties. Distinctiveness may be determined by considering internal statistics of segments in the image.

In some exemplary embodiments, a principal component analysis may be applied to detect distinctive segments of the image. The principal component analysis may be employed to reveal the internal structure of data represented by the image. The principal component analysis may find components of the image that best explain the variance in the data. In some exemplary embodiments, the principal component analysis may be used to represent the set of segments of the image. The representation may be used to determine distinctiveness of the segments. The principal component analysis may be based on internal statistics of the image segments. In some exemplary embodiments, the principal component analysis may be mathematically defined as an orthogonal linear transformation that transforms the data to a new coordinate system such that the greatest variance by some projection of the data comes to lie on the first coordinate (called the first principal component), the second greatest variance on the second coordinate, and so on. Additionally or alternatively, the principal component analysis may supply a lower dimensional coordinating system for the set of segment visualizing the image. This may be done by using only the first few principal components so that the dimensionality of the transformed data may be reduced. The principal component analysis may incorporate more domain specific assumptions about the underlying structure of the image. In some exemplary embodiments, the principal component analysis may define a new coordinate system that optimally describe variance in segments dataset. In some exemplary embodiments, a distinctiveness measurement of a segment may be computed by summing the coefficients of the segment in the new coordinate system.

Additionally or alternatively, an average segment of the image may be calculated. An image segment may be considered distinctive, if it is dissimilar to the average segment.

In Step 120, pairs of segments may be selected based on the distinctiveness of the segments. In some exemplary embodiments, a set of 2×K segments comprising the most distinctive segments of the image may be selected in order to be used to define the K bits signature. The K pairs of segments may be selected from the set of selected segments, either automatically, heuristically or in another manner.

In some exemplary embodiments, each selected segment may be a local maximum segment in a saliency map of the image. Additionally or alternatively, each selected segment may be randomly chosen from a neighborhood of a local maximum segment in a saliency map. The saliency map may be a topographically arranged map that represents visual saliency of the image. In some exemplary embodiments, the saliency map may be applied based on color differentiation, intensity differentiation, orientation, motion, or the like.

In some exemplary embodiments, a set of J pairs of segments may be randomly selected. Differences between each pair of segments may be computed. The K pairs of segments may be selected to be a subset of the set of pairs of segments with the largest computed differences or based on other selection criterion.

In Step 125, an encoding function may be created for the image based on the selected pairs of segments. The encoding function may be a function that encodes a representing signature value for the image based on the selected pairs of segments. In some exemplary embodiments, the function may encode the representing signature value based on the relation between a first segment and a second segment of each pair of segments. In some exemplary embodiments, the encoding function may be a function which encode a bit in a result value based on a relation between the first segment and the second segment of the each of segments. As an example, the encoding function may be a function computing a binary representation signature values, such as: $f_n(p) = \Sigma_{1 \le i \le n} 2^{i-1} \tau(p; x_i, y_i)$. In some exemplary embodiments, $\tau(p; x_i, y_i)$ may be a function representing the difference between each selected pair of segments: $x_i$ and $y_i$, from image p. The function may be for example:

$$\tau(p; x_i, y_i) = \begin{cases} 1 : p(x) < p(y) \\ 0 : p(x) \ge p(y) \end{cases} \cdot p(x)$$

may be a value representing segment x within the function p which depicts the image. The value may be determined based on the color of the segments, the pattern of the segment, or the like. As a simplified example, the value may be determined as:

$$p(x) = \begin{cases} 1 : \text{color}(x) = \text{red} \\ 0 : \text{color}(x) = \text{blue} \end{cases}.$$

However, it will be understood that the function p may relate to any one or more parameters of the image and the relevant segment, such as for example a median color, an average brightness, an aggregated contrast, combination thereof, or the like.

In Step 130, the encoding function may be applied on the image to obtain a signature value. The encoding function may encode different signature values for different sets of pairs of segments. Different encoding functions may encode different signature values for the same set of pairs of segments. In some exemplary embodiments, applying the encoding function on the image may be performed in a linear time with respect to a number of bits in the signature value.

In Step 135, the signature value and the encoding function may be stored in a computer readable storage medium, such as a local hard disk or a remote storage server. The set of bits that comprise the signature value may be stored to be retrieved and used to compare other images with the class image. Additionally or alternatively, the encoding function may be stored in a manner allowing to retrieve the encoding function and apply it on other images.

In Step 140, the signature value and the encoding function may be used to compare another image with the image. In some exemplary embodiments, the signature value and the encoding function may be retrieved from the storage medium and used for the comparison. The comparison may be useful for classifying the other image.

Referring now to FIG. 1B showing a flowchart diagram of a method, in accordance with some exemplary embodiments of the disclosed subject matter.

In Step 150, a set of encoding functions and signature values of class images may be obtained. Each class image may represent a class of similar images, such as images of the same object or of similar objects.

In some exemplary embodiments, the encoding functions and the signature values may be obtained from a computer readable storage medium, such as described in Step 130 of FIG. 1A. Additionally or alternatively, the encoding functions and the signature values may be produced using a method such as described in FIG. 1A.

In Step 160, an image to be classified may be obtained. In some exemplary embodiments, the image may be processed such as for identifying a foreground object and excluding background, refining blurred sections of the image, tilting the object to a normalized angle, or the like.

In Step 170, a transformation from the image to each class image may be determined. The transformation may be determined to overcome structural difference, photographic difference, or other differences between the image and each class image. The difference may be a difference between the size of the image and the size of each class image, difference between the brightness of the image and the brightness of each class image, difference between the clarity of the image and the clarity of each class image, difference between the declension of the image and the declension of each class image, difference between the angle from which an object is depicted in the image and the angle from which the object is depicted in the class image, or the like. The difference may occur due to different imaging equipment used to take the image, different sources of the images, or the like. In some exemplary embodiments, the transformation may be a function mapping a set of segments of the image to another set of segments that matches the segments of the class image which are used in the encoding function.

In Step 180, the encoding function of each class image may be applied on the image to produce a value. The encoding function may be applied using the corresponding transformation of the image to each class image. Referring to the above mentioned example of an encoding function, the encoding function $$\tau(p; x_i, y_i) = \begin{cases} 1 : p(x) < p(y) \\ 0 : p(x) \geq p(y) \end{cases}$$

may be applied using the corresponding transformation for each image, i.e.:

$$\tau(p'; x_i, y_i) = \begin{cases} 1 : p'(T_j(x)) < p'(T_j(y)) \\ 0 : p'(T_j(x)) \geq p'(T_j(y)) \end{cases} \cdot p'(x)$$

may be a value representing segment x within the function p' which depicts the image to be classified. $T_j(x)$ may be a transformation from the image to a class image j. $T_j(x)$ may map each segment x of the image to a new segment that matches the class image. In some exemplary embodiments, given a set of K pairs of segments $(x_i, y_i)$ as defined for the encoding function of class j, τ may be applied on all sets to produce a K bit value for the image to be classified.

In Step 190, a class to which the image is classified may be determined. The class may be determined based on the value produced for the image for each class image and the signature value of the class image associated with the class. In some exemplary embodiments, the image may be classified to the class associated with the class image with the most similar signature value to the value produced for the image by applying the encoding function of the class image. In some exemplary embodiments, the signature value and the produced values may be binary values. A hamming distance between each produced value and the signature value of the corresponding class image may be computed to indicate similarity. The image may be classified to the class associated with class image for which a minimal hamming distance is computed. In some exemplary embodiments, and in order to allow a determination that the image is not classified to any class, a threshold distance may be used. In case all the computed distances are above the threshold distance, it may be determined that the image is not associated with any class that was examined. As an example, a hamming distance which indicates dissimilarity in about 20% of the values or more may be set as the threshold distance. However, a person of ordinary skill in the art would recognize that other threshold values may be used. Additionally or alternatively, other similarity measurements may be used instead of or in addition to Hamming distance.

Referring now to FIG. 2 showing an illustration of class images and an image to be classified, in accordance with some exemplary embodiments of the disclosed subject matter.

In some exemplary embodiments, a Class Image 200 may represent a class of images. Class Image 200 may be an image representing a class of images of a shampoo bottle. Similarly, a Class Image 210 and a Class Image 220 may represent different classes of images.

Despite the fact the three class images may look similar, they may represent different classes. For example, Class Image 200 may represent images of shampoo bottles with a caption specifying a "2in1" shampoo, while Class Image 210 may represent images of "Normal to Greasy hair" shampoos from a same shampoo brand, "Timotei pure" and Class Image 220 may represent images of bottles of "Vivid Colour" shampoo, from the same brand "Timotei" without "pure" caption. In some exemplary embodiments, the most distinctive segments of each class image may be selected. Pairs of segments may be selected from the most distinctive segments for each class image, to create an encoding function for each class image.

In some exemplary embodiments, a Segment 202, a Segment 204, a Segment 206 and a Segment 208 may be selected to be used for encoding a signature value for the class and for defining an encoding function for the class. Segments 202, 204, 206, 208 may be the most distinctive segments of Class Image 200, such as segments which are relatively different than all other segments of the image. As an illustrative example, Segment 202 may include text thereby differentiating it from most of the segments which show the bottle itself. As another illustrative example, Segment 204 may include a graphical element different than its surrounding and not repeating in Class Image 200. A set of pairs of segments may be selected for Class Image 200, from the distinctive segments, Segment 202, Segment 204, Segment 206 and Segment 208, in order to produce a signature of 2 bits (or less). The set of pairs of segments may be for example: {(Segment 202, Segment 204), (Segment 206, Segment 208)}, {(Segment 206, Segment 204, (Segment 202, Segment 208)} or {(Segment 202, Segment 206), (Segment 204, Segment 208)}. In some exemplary embodiments, the selection of the pairs may be random, based on a heuristic, deterministic, or the like. In one example, the selected pair may be {(Segment 202, Segment 204), (Segment 206, Segment 208)}. The encoding function for the class represented by Image Class 200 may make use of the selected pairs, such as by comparing the relation between Segment 202 and Segment 204 in order to encode a first bit in the signature and comparing the relation between Segment 206 and Segment 208 in order to encode a second bit in the signature.

Similarly, a Segment 212, a Segment 214, a Segment 216 and a Segment 218 may be selected in Class Image 210, and a Segment 222, a Segment 224, a Segment 226 and a Segment 228 may be selected for Class Image 220. Different segments (e.g., locations in the images) may be selected for different class images. For example, Segment 202 of Class Image 200 may be different from all the segments in Class Image 210 and all segments in Class Image 220. Accordingly, different sets of pairs of segments may be selected for different class images.

In some exemplary embodiments, an encoding function may be created for each class image based on the selected pairs of segments of the class image. Each encoding function may be applied on each corresponding class image to obtain a signature value for that class.

In some exemplary embodiments, an Image 230 may be an image to be classified. In some exemplary embodiments, transformations of Image 230 to Class Image 200, Class Image 210 and Class Image 220 may be determined Each transformation may be different. Each transformation may be determined to overcome differences or distortions between the image and a corresponding class image. For example, a transformation from Image 230 to Class Image 200 may apply tilting on Image 230 to match a rotation of the object as appearing in Class Image 200.

In some exemplary embodiments, each encoding function of Class Image 200, Class Image 210 and Class Image 220 may be applied on Image 230, using the corresponding transformation from Image 230 to the class image, to produce a value. In order to compute the value with respect to the first class, segments in Image 230 that correspond to Segments 202, 204, 206 and 208 may be evaluated and their ordinal statistics may be determined.

Each produced value may be compared with the corresponding signature value to determine which class image is the most similar to Image 230. In this illustration, Class Image 210 may be the class image which its corresponding signature value is the most similar to the value produced for Image 230. As an example, the hamming distance between the signature value of Class Image 210 and the value of Image 230 may be the smallest out of the three and below a predetermined threshold.

Referring now to FIG. 3 showing a computerized environment in which the disclosed subject matter is used, in accordance with some exemplary embodiments of the subject matter.

An Apparatus 300 may be configured to classify an image to an image class. Additionally or alternatively, Apparatus 300 may be configured to perform the methods depicted in FIGS. 1A and 1B.

In some exemplary embodiments, Apparatus 300 may comprise a Processor 302. Processor 302 may be a Central Processing Unit (CPU), a microprocessor, an electronic circuit, an Integrated Circuit (IC) or the like. Processor 302 may be utilized to perform computations required by Apparatus 300 or any of it subcomponents.

In some exemplary embodiments of the disclosed subject matter, Apparatus 300 may comprise an Input/Output (I/O) Module 304. I/O Module 304 may be utilized to provide an output to and receive input from a User 360. In some exemplary embodiments, Apparatus 300 may operate without having a user. I/O Module 304 may be used to obtain an image to be classified, such as 230 of FIG. 2. I/O Module 304 may be used to output the image class for which the image is classified.

In some exemplary embodiments, Apparatus 300 may comprise a Memory Unit 306. Memory Unit 306 may be a hard disk drive, a Flash disk, a Random Access Memory (RAM), a memory chip, or the like. In some exemplary embodiments, Memory Unit 306 may retain program code operative to cause Processor 302 to perform acts associated with any of the subcomponents of Apparatus 300.

In some exemplary embodiments of the disclosed subject matter, Apparatus 300 may comprise a Distinctiveness Determinator 310. Distinctiveness Determinator 310 may be configured to compute distinctiveness of segment within an image. Distinctiveness Determinator 310 may compute the distinctiveness of the segments based on internal statistics of the image.

In some exemplary embodiments of the disclosed subject matter, Apparatus 300 may comprise a Principal Component Analysis Module 320. Principal Component Analysis Module 320 may be configured to apply a principal component analysis to detect distinctive segments of the image.

In some exemplary embodiments of the disclosed subject matter, Apparatus 300 may comprise a Saliency Map Generator 330. Saliency Map Generator 330 may be configured to create saliency maps of images to be classified.

In some exemplary embodiments of the disclosed subject matter, Apparatus 300 may comprise a Pairs Selector 340. Pairs Selector 340 may be configured to select pairs of most distinctive segments in an image. In some exemplary embodiments, Pairs Selector 340 may select segments that are local maximum segments in a saliency map produced by Saliency Map Generator 330.

In some exemplary embodiments of the disclosed subject matter, Apparatus 300 may comprise an Encoding Functions Creator 350. Encoding Functions Creator 350 may be configured to create an encoding function for an image based on pairs of segments selected by Pairs Selector 340. In some exemplary embodiments, the encoding function may be a function that is defined based on an ordinal relation between the segments of each pair of segments.

In some exemplary embodiments of the disclosed subject matter, Apparatus 300 may comprise a Signature Values Calculator 360. Signature Values Calculator 360 may be configured to calculate a signature value for each image, by applying the encoding function created by Encoding Function Creator 350 to the image on the segments of the image.

In some exemplary embodiments of the disclosed subject matter, Apparatus 300 may comprise an Image Transformation Module 370. Image Transformation Module 370 may be configured to determine a transformation from an image to a class image, to overcome differences between the image and the image class before comparing them. Signature Values Calculator 360 may be configured to apply the encoding function of the image, using the transformation determined by Image Transformation Module 370 on the image to calculate a signature value that is to be compared with the signature value of the corresponding class image.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
obtaining a set of encoding functions and signature values which corresponds to a set of class images, wherein each pair of an encoding function and a signature value corresponds to a class image of the set of class images, wherein the signature value is a value produced by applying the encoding function on the class image;
obtaining an image to be classified to a class, wherein the class is associated with a class image of the set of class images;
with respect to each class image of the set of class images:
determining a transformation from the image to the class image; and
applying the encoding function using the transformation on the image to produce a value; and
automatically determining, by a processor, a class to which the image is classified based on the values and the signature values.

2. The method of claim 1, wherein the encoding function of a class image is computed based on pairs of segments of the class image, wherein the pairs of segments are selected based on distinctiveness of segments of the class image, wherein the distinctiveness of segments is computed based on internal statistics of the class image.

3. The method of claim 2, wherein the encoding function is a function which encodes a bit in a result value based on a relation between a first segment of a pair of segments and a second segment of the pair of segments.

4. The method of claim 1, wherein the signature value and the produced values are binary values, wherein said automatically determining comprises: computing a hamming distance between each produced value and the signature value, and classifying the image to the class that is associated with a class image for which a minimal hamming distance is computed.

5. The method of claim 1, wherein said applying is performed in a linear time with respect to a number of bits in the signature value, wherein said automatically determining is performed in a linear time with respect to a multiplication of the number of bits in the signature value and a total number of classes.

6. A method comprising:
obtaining an image that is representative of a class of images;
computing, based on internal statistics of the image, distinctiveness of segments in the image, wherein said computing is performed by a processor;
selecting pairs of segments based on the distinctiveness of the segments;
creating an encoding function for the image based on the pairs of segments, wherein the encoding function is configured to provide a value for a second image based on properties of the second image at segments which correspond to the pairs of segments;
applying the encoding function on the image to obtain a signature value; and
storing, in a non-transitory computer readable medium, the signature value and the encoding function;
whereby enabling comparing another image with the image by applying the encoding function on the other image and comparing a resulting value with the signature value.

7. The method of claim 6, wherein said computing comprises applying a principal component analysis to detect distinctive segments of the image.

8. The method of claim 6, wherein said selecting comprises selecting pairs of segments, wherein each selected segment is a local maximum segment in a saliency map.

9. The method of claim 6, wherein said selecting comprises selecting pairs of segments, wherein each segment is randomly chosen from a neighborhood of a local maximum segment in a saliency map.

10. The method of claim 6, wherein said selecting the pairs of segments comprises:
randomly selecting a set of pairs of segments;
computing differences between each pair in the set of pairs of segments; and
selecting the pairs of segments to be a subset of the set of pairs of segments with the largest computed difference.

11. The method of claim 6, wherein a segment is a set of one or more adjacent pixels.

12. The method of claim 6, wherein a segment is a set of one or more adjacent pixels arranged in substantially a rectangular shape.

13. A computerized apparatus having a processor, the processor being adapted to perform the steps of:
obtaining a set of encoding functions and signature values which corresponds to a set of class images, wherein each pair of an encoding function and a signature value corresponds to a class image of the set of class images, wherein the signature value is a value produced by applying the encoding function on the class image;
obtaining an image to be classified to a class, wherein the class is associated with a class image of the set of class images;
with respect to each class image of the set of class images:
determining a transformation from the image to the class image; and
applying the encoding function using the transformation on the image to produce a value; and
automatically determining, a class to which the image is classified based on the values and the signature values.

14. The computerized apparatus of claim 13, wherein the encoding function of a class image is computed based on pairs of segments of the class image, wherein the pairs of segments are selected based on distinctiveness of segments of the class image, wherein the distinctiveness of segments is computed based on internal statistics of the class image.

15. The computerized apparatus of claim 14, wherein the encoding function is a function which encodes a bit in a result value based on a relation between a first segment of a pair of segments and a second segment of the pair of segments.

16. The computerized apparatus of claim 13, wherein the signature value and the produced values are binary values, wherein said automatically determining comprises: computing a hamming distance between each produced value and the signature value, and classifying the image to the class that is associated with a class image for which a minimal hamming distance is computed.

17. The computerized apparatus of claim 13, wherein said applying is performed in a linear time with respect to a number of bits in the signature value, wherein said automatically determining is performed in a linear time with respect to a multiplication of the number of bits in the signature value and a total number of classes.

* * * * *